(12) United States Patent
Li

(10) Patent No.: US 12,402,604 B2
(45) Date of Patent: Sep. 2, 2025

(54) THREE-POINT QUICK-THREADING BUCKLE AND TRACTION LEASH WITH QUICK-THREADING BUCKLE

(71) Applicant: Kuo-Ming Li, Tainan (TW)

(72) Inventor: Kuo-Ming Li, Tainan (TW)

( * ) Notice: Subject to any disclaimer, the term of this patent is extended or adjusted under 35 U.S.C. 154(b) by 25 days.

(21) Appl. No.: 18/425,287

(22) Filed: Jan. 29, 2024

(65) Prior Publication Data

US 2025/0185629 A1    Jun. 12, 2025

(30) Foreign Application Priority Data

Dec. 11, 2023   (CN) .......................... 202323371145.6

(51) Int. Cl.
*A01K 27/00* (2006.01)
*F16G 11/14* (2006.01)

(52) U.S. Cl.
CPC .......... *A01K 27/003* (2013.01); *A01K 27/002* (2013.01); *F16G 11/14* (2013.01)

(58) Field of Classification Search
CPC .. A01K 27/002; A01K 27/003; A01K 27/005; F16G 11/14
USPC .............................................................. 24/18
See application file for complete search history.

(56) References Cited

U.S. PATENT DOCUMENTS

| | | | | | |
|---|---|---|---|---|---|
| 1,541,701 | A | * | 6/1925 | Gaunt ...................... | A41F 11/16 24/321 |
| 1,806,162 | A | * | 5/1931 | Hahn ....................... | A43C 7/04 24/712.9 |
| 2,233,397 | A | * | 3/1941 | Bloom ................. | A01K 27/002 119/857 |
| 2,458,252 | A | * | 1/1949 | Chatterton ............. | B65D 63/14 24/129 B |
| 2,817,393 | A | * | 12/1957 | Mitchell .............. | A47D 15/006 297/484 |
| 3,675,276 | A | * | 7/1972 | Nuse ...................... | A01K 91/04 43/42.49 |
| 4,540,218 | A | * | 9/1985 | Thomas ............... | B60N 2/2812 297/484 |
| 4,939,820 | A | * | 7/1990 | Babcock ............... | F16G 11/046 24/129 B |

(Continued)

FOREIGN PATENT DOCUMENTS

| | | |
|---|---|---|
| CN | 205813173 U | 12/2016 |
| CN | 214903044 U | 11/2021 |

*Primary Examiner* — Michael H Wang
(74) *Attorney, Agent, or Firm* — Westbridge IP LLC

(57) ABSTRACT

Disclosed are a three-point quick-threading buckle and a traction leash with the quick-threading buckle, including a leash body, and a quick-threading buckle and a limiting buckle. A first mounting hole, a second mounting hole and a third limiting hole are formed in the quick-threading buckle, the first mounting hole and the second mounting hole are respectively formed on left and right sides of the quick-threading buckle, the third limiting hole is disposed between the first mounting hole and the second mounting hole; the leash body between the first mounting hole and the second mounting hole defines a first loop ring, and the leash body between the second mounting hole and the third limiting hole defines a second loop ring. By disposing the quick-threading buckle, the traction leash may be directly worn on the body of a pet, a collar or a chest brace does not need to be used.

2 Claims, 5 Drawing Sheets

(56) References Cited

U.S. PATENT DOCUMENTS

| | | | | |
|---|---|---|---|---|
| 4,941,434 A * | 7/1990 | Ellwanger | B60R 22/10 24/129 B |
| 5,103,537 A * | 4/1992 | Snyder | A44B 11/2553 24/265 R |
| 5,210,911 A * | 5/1993 | Brown | B65D 63/16 24/129 B |
| 5,359,964 A * | 11/1994 | Sporn | A01K 27/002 D30/152 |
| 5,361,953 A * | 11/1994 | Nichols | F41C 33/046 224/198 |
| 5,432,985 A * | 7/1995 | Bernart | A44B 11/04 24/265 AL |
| 5,613,467 A * | 3/1997 | Arakawa | A01K 1/0272 119/771 |
| 5,676,093 A * | 10/1997 | Sporn | A01K 27/002 119/864 |
| 6,968,600 B2 * | 11/2005 | Marcaccio | B64D 1/22 24/130 |
| 7,299,527 B1 * | 11/2007 | Gyure | A44B 11/006 24/265 AL |
| 7,357,099 B2 * | 4/2008 | Smith | A01K 27/002 119/856 |
| 7,387,088 B2 * | 6/2008 | Sporn | A01K 27/002 119/856 |
| 9,468,195 B2 * | 10/2016 | Blizzard | A01K 27/003 |
| 9,714,002 B2 * | 7/2017 | Cheng | B60N 2/2812 |
| 9,981,779 B2 * | 5/2018 | Tanimoto | B65D 88/1668 |
| 10,631,523 B2 * | 4/2020 | Sporn | A01K 27/002 |
| D1,000,936 S * | 10/2023 | Jimarez Howard | D30/153 |
| D1,002,342 S * | 10/2023 | Isler | D30/153 |
| 2011/0192355 A1 * | 8/2011 | Van Duyl-Spaargaren | A01K 27/003 119/793 |
| 2011/0203532 A1 * | 8/2011 | Edlin | A01K 27/005 119/792 |
| 2014/0116355 A1 * | 5/2014 | Blizzard | A01K 27/005 119/793 |
| 2017/0142936 A1 * | 5/2017 | Louro | A01K 27/005 |
| 2019/0343084 A1 * | 11/2019 | Mason | A01K 27/001 |

* cited by examiner

THREE-POINT QUICK-THREADING BUCKLE AND TRACTION LEASH WITH QUICK-THREADING BUCKLE

CROSS-REFERENCE TO RELATED APPLICATIONS

This application claims priority to Chinese Patent Application No. 202323371145.6, filed on Dec. 11, 2023, which is incorporated herein by reference in its entirety.

TECHNICAL FIELD

The application relates to the technical field of pet articles, in particular to a three-point quick-threading buckle and a traction leash with the quick-threading buckle.

BACKGROUND

With the continuous progress of social civilization, raising of pets has gradually become a way for people to eliminate loneliness or entertainment. A traction leash is an indispensable dog feeding apparatus for every raiser, and most of existing traction leashes use a collar or a chest brace. If the collar is used together with the traction leash, during use, if a pet is out of control, pulling hard will easily cause discomfort to the neck of the pet. If the chest brace is used together with the traction leash, not only is the wearing process of the chest brace complicated, but also two accessories, the chest brace and the traction leash, need to be purchased, and the cost is relatively high.

For example, Chinese patent CN205813173U discloses a pet traction chest brace, which includes a chest brace body and a traction leash, the chest brace body includes a chest fixing strap, an abdomen fixing strap and a group of metal fasteners, the chest fixing strap includes a first leash belt and a second leash belt, the end parts of the first leash belt and the second leash belt are respectively connected by one metal fastener to form a closed leash loop, and the abdomen fixing strap is connected between the first leash belt and the second leash belt; the traction leash includes a handle, a leash belt and a connecting lock catch, the leash belt is connected with the connecting lock catch through a metal connector, and the connecting lock catch is connected with the metal fastener in a hooked mode.

However, such a traction leash has problems of complicated wearing, many accessories, and high cost. Meanwhile, in an adjusting mode of the collar, an adjusting buckle is adopted for adjustment, which is placed on the neck and chest of the pet, and is just on a force position during the process of pulling the leash, so that the comfort of use is poor. In addition, the adjustable range of the length is relatively small. Moreover, the neck and chest traction leash adopts an inserting fastener for buckling on the back; and the inserting fastener structure has the possibility of loosing.

SUMMARY

In view of this, in order to overcome the defects of the relevant art, the application provides a three-point quick-threading buckle and a traction leash with the quick-threading buckle.

A three-point quick-threading buckle is configured to mount a leash body. A first mounting hole, a second mounting hole and a third limiting hole are formed in the three-point quick-threading buckle for a pet, the first mounting hole and the second mounting hole are respectively formed on left and right sides of the quick-threading buckle, the third limiting hole is disposed between the first mounting hole and the second mounting hole; and one end of the leash body is fixedly mounted in the first mounting hole, and the other end sequentially penetrates in the second mounting hole and the third limiting hole.

Furthermore, a guide groove is included, which communicates the third limiting hole and the outer side, and the leash body is clamped into the third limiting hole from the guide groove.

Furthermore, both the first mounting hole and the second mounting hole are of a rectangular hole structure, and the first mounting hole and the second mounting hole are distributed in a splayed shape with a distance gradually becoming wider from the front side end to the rear side end.

Furthermore, the third limiting hole is of an inclined long hole structure, and its two ends in the length extending direction face the first mounting hole and the second mounting hole respectively.

Furthermore, the left side end of the third limiting hole faces the rear end of the second mounting hole, and the right side end of the third limiting hole faces the front side end of the first mounting hole.

Furthermore, a notch groove is further formed at a rear side end of the three-point quick-threading buckle, and the notch groove communicates with the third limiting hole through the guide groove.

Furthermore, a convex part is further disposed at a front side end of the three-point quick-threading buckle, and the convex part is disposed corresponding to the position of the notch groove.

Furthermore, the three-point quick-threading buckle includes a metal plate in the middle and a plastic part covering the outer side of the metal plate, and the metal plate extends out of the outer side of the plastic part from edges of left and right sides of the quick-threading buckle to form a metal locating part.

A traction leash with a three-point quick-threading buckle includes a leash body, and a quick-threading buckle and a limiting buckle mounted on the leash body, the quick-threading buckle is the above three-point quick-threading buckle, the leash body includes a mounting end and a free end, the mounting end is fixed in the first mounting hole, and the free end sequentially passes through the second mounting hole, the third limiting hole and the limiting buckle; the leash body between the first mounting hole and the second mounting hole defines a first loop ring, and the leash body between the second mounting hole and the third limiting hole defines a second loop ring; and the leash body extending out of the outer side of the limiting buckle forms a traction part.

Furthermore, the limiting buckle includes a top limiting buckle and a bottom limiting buckle, and both the top limiting buckle and the bottom limiting buckle are mounted on the leash body on the upper and lower sides of the third limiting hole.

To sum up, by disposing the quick-threading buckle and the leash body, the functions of the traction leash, collar and chest brace are integrated; and meanwhile, the advantages of fewer accessories, low cost, convenient wearing, fastness and good balance are achieved. Meanwhile, for the size of the loop ring, size adjustment within a wide range may be realized, and the application range is wide. The quick-threading buckle is of an integrated structure and does not need assembly, and compared with a split type fastener structure, it has no risk of buckling loosing; and meanwhile, the structure is simple, and the production is easy. In addition, the overall structure of the quick-threading buckle is reasonable in configuration, which has excellent safety and convenience for use of pets. The application has strong practicability and strong popularization significance.

DETAILED DESCRIPTION OF THE EMBODIMENTS

In order to make the purpose, technical solutions and advantages of the application clearer, the application will be further described below in combination with the drawings and embodiments. It is to be understood that the specific embodiments described herein are for the purpose of explaining the application only and are not intended to limit the application.

Figure 1:
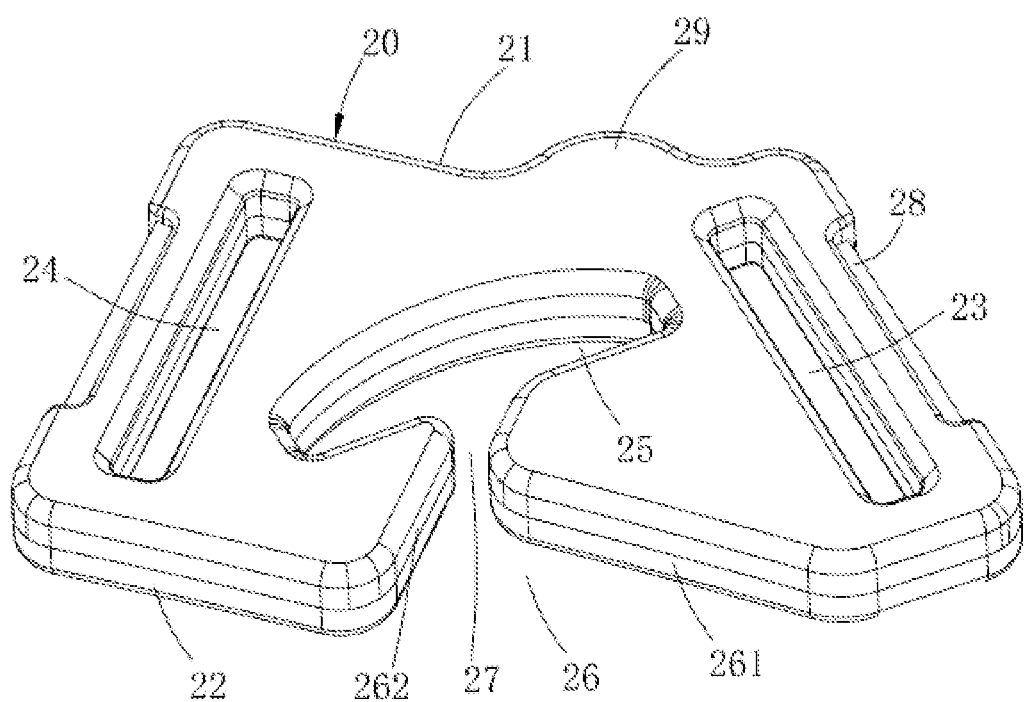
FIG. 1 is a schematic structure diagram of a three-point quick-threading buckle for a pet of the application.
Figure 2:
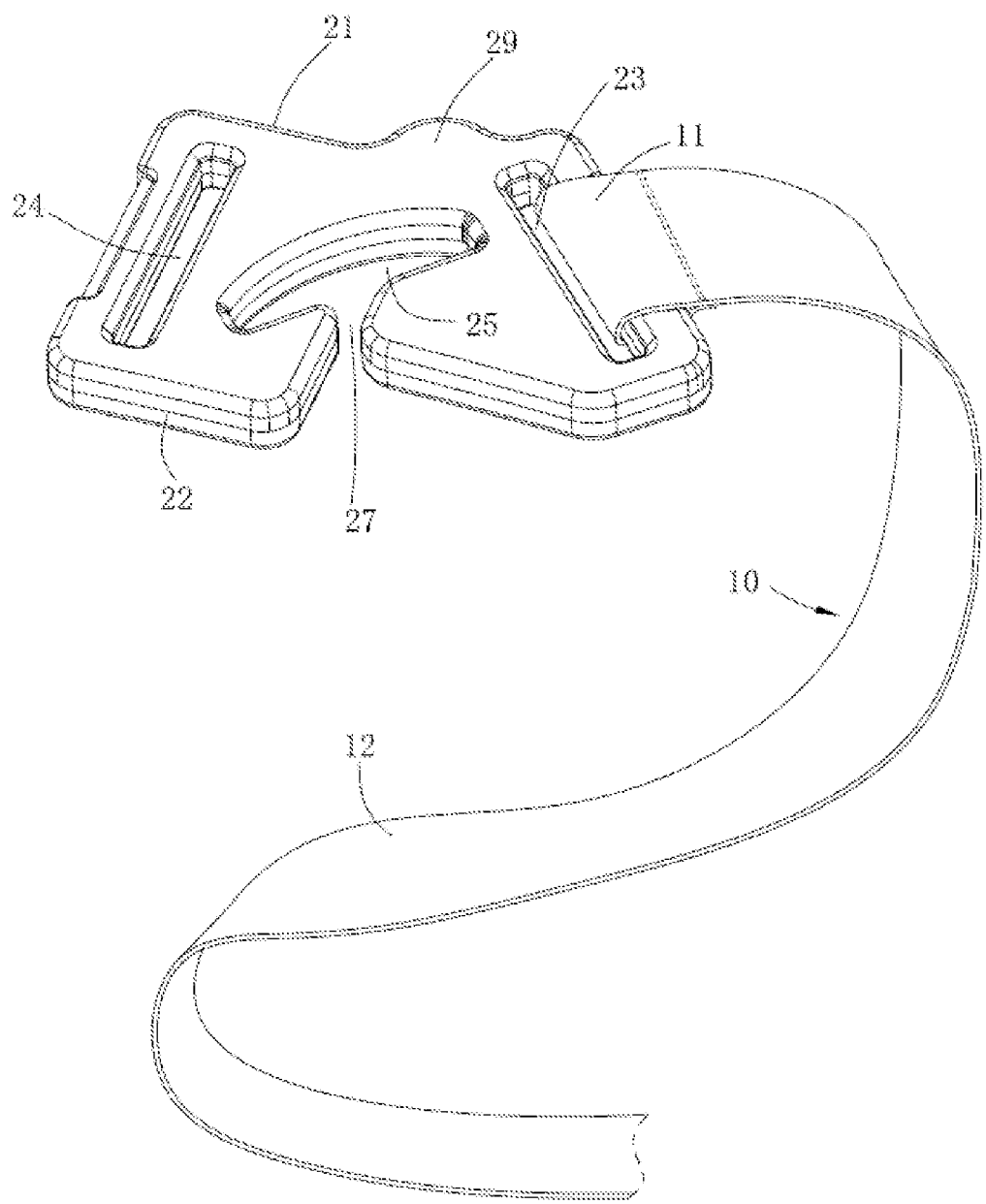
FIG. 2 is an initial state diagram before use of a quick-threading buckle of FIG. 1.
Figure 3:
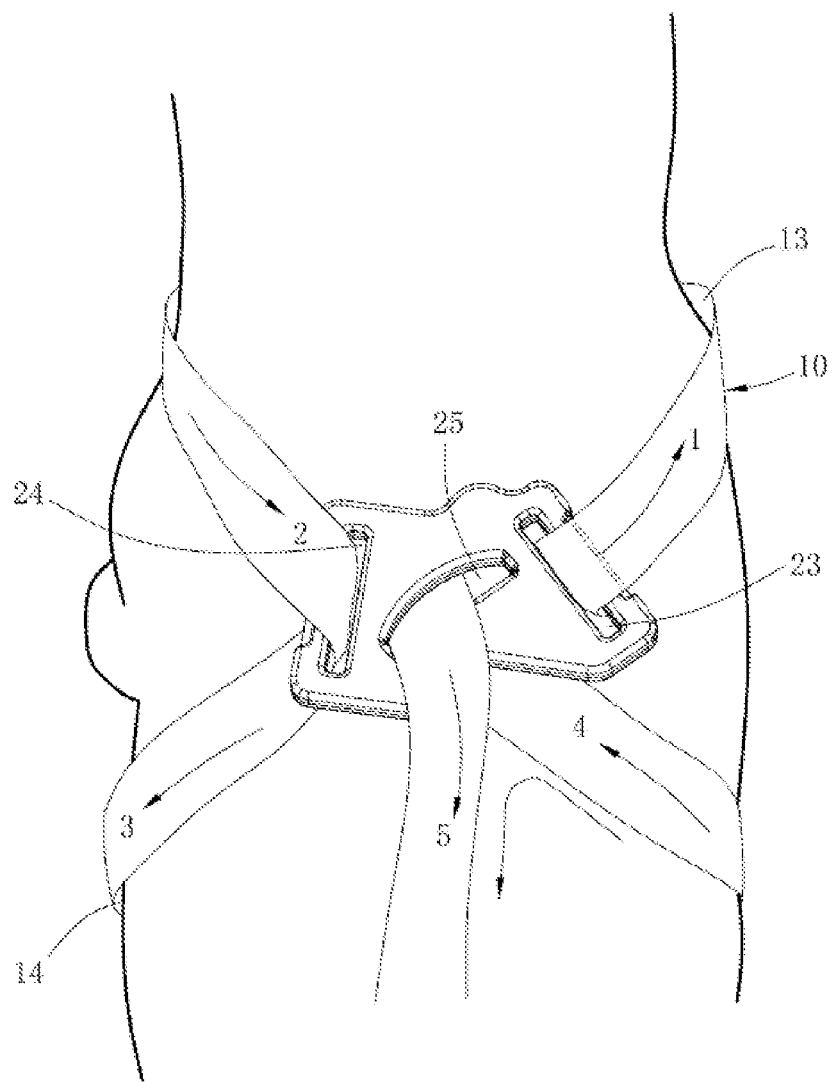
FIG. 3 is a schematic diagram of threading tread of a traction leash of FIG. 2.
Figure 4:
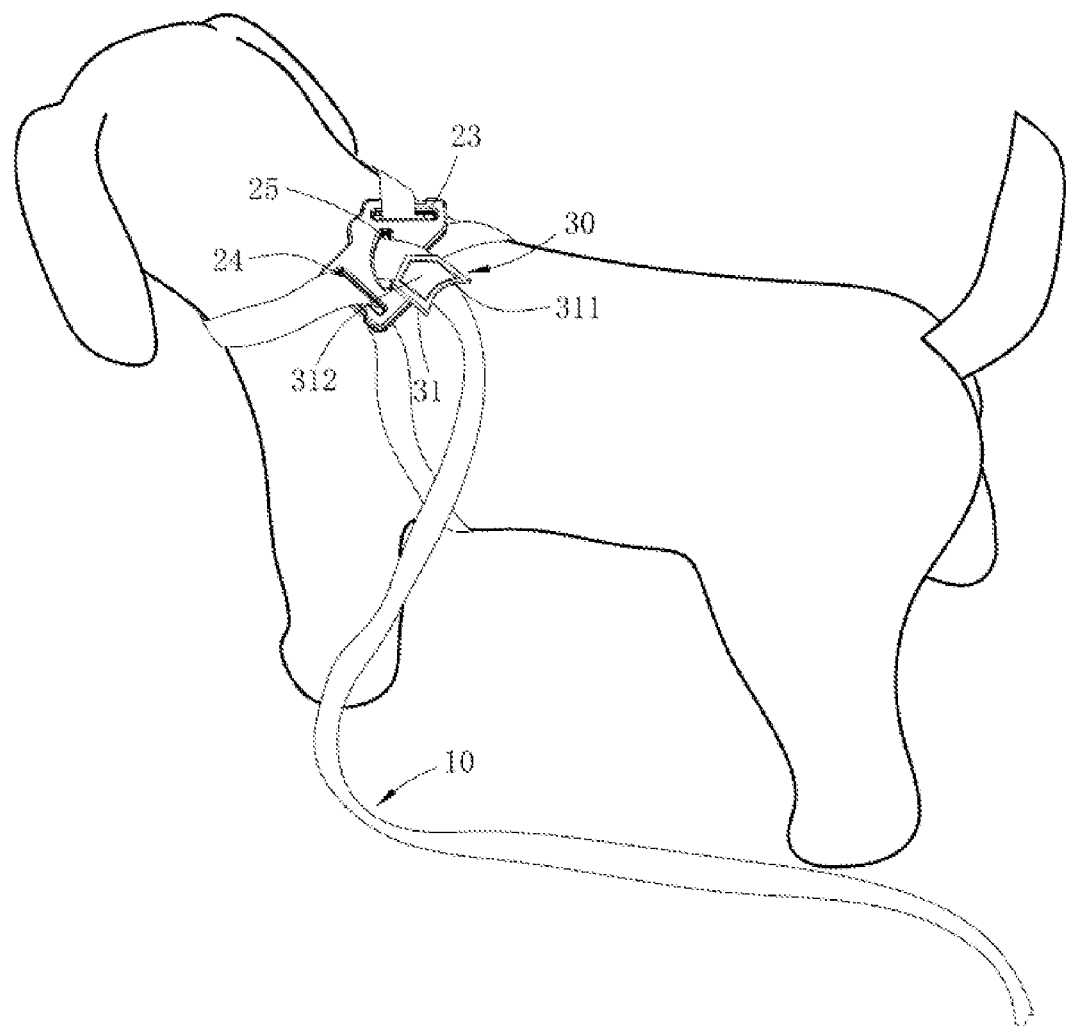
FIG. 4 is a use state diagram of a traction leash of FIG. 3.
Figure 5:
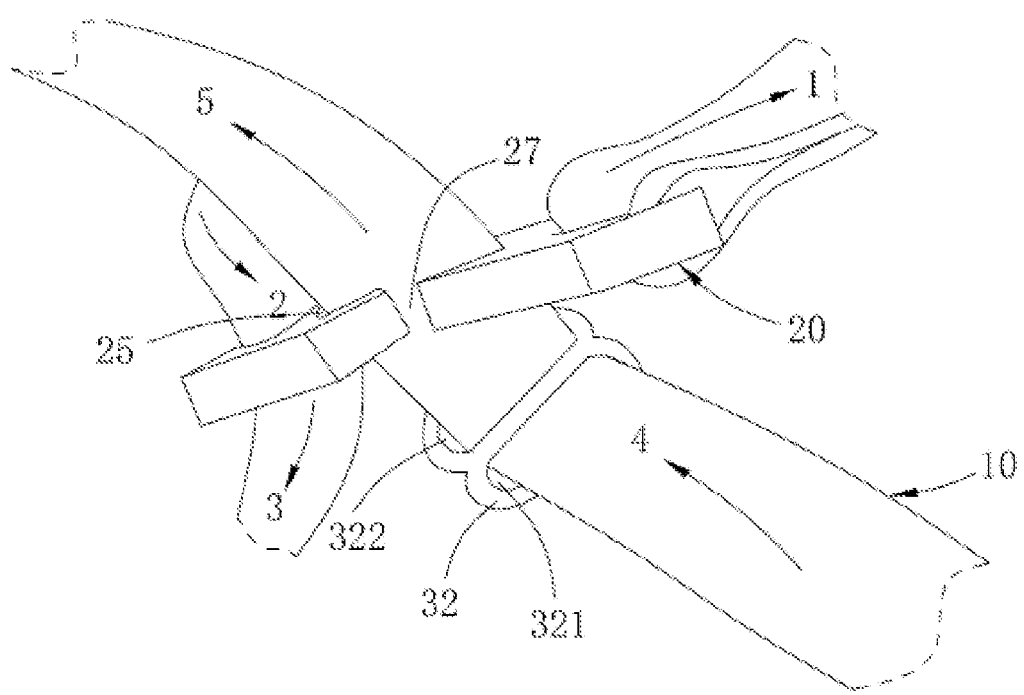
FIG. 5 is a schematic diagram of the back of a traction leash in FIG. 4 at a position of a quick-threading buckle.

As shown in FIGS. 1-5, the application provides a traction leash for a pet with a three-point quick-threading buckle. The traction leash for a pet with the three-point quick-threading buckle includes a leash body 10, and a quick-threading buckle 20 and a limiting buckle 30 mounted on the leash body 10, one end of the leash body 10 is fixedly mounted on the quick-threading buckle 20, the other end sequentially penetrates through the quick-threading buckle 20 and forms two loop rings, one loop ring sleeves the neck of the pet, and the other loop ring sleeves the chest of the pet; and the limiting buckle 30 is configured to limit the leash body 10, so that the leash body 10 with the size of the loop ring adjusted may be fixed and maintained. In the embodiment, the leash body 10 is of a wide flat structure, in order to limit the position and improve the comfort of wearing.

A front side end 21 and a rear side end 22 are disposed on the quick-threading buckle 20, a first mounting hole 23, a second mounting hole 24 and a third limiting hole 25 are formed in the quick-threading buckle 20, the first mounting hole 23 and the second mounting hole 24 are respectively formed on left and right sides of the quick-threading buckle 20, and the third limiting hole 25 is disposed between the first mounting hole 23 and the second mounting hole 24. In the embodiment, both the first mounting hole 23 and the second mounting hole 24 are of a rectangular hole structure, the two mounting holes are distributed in a splayed shape along its length extending direction, and the distance between the two gradually becomes wider from the front side end 21 to the rear side end 22. The third limiting hole 25 is of an inclined long hole structure, and its two ends in the length extending direction face the first mounting hole 23 and the second mounting hole 24 respectively. Specifically, the left side end of the third limiting hole 25 faces the rear end of the second mounting hole 24, and the right side end of the third limiting hole 25 faces the front side end of the first mounting hole 23.

A notch groove 26 is further formed at the rear side end 22 of the quick-threading buckle 20, the notch groove 26 communicates with the third limiting hole 25, and the notch groove 26 is disposed in the middle and on the right side of the rear side end 22. In the embodiment, the end face of the front side end 21 is disposed in a V shape as a whole, the rear side end 22 is disposed parallel to the end face of the front side end 21, the inner side wall of the notch groove 26 is disposed in an L shape, and includes a transverse edge 261 and a vertical edge 262, the transverse edge 261 is disposed on one side of the first mounting hole 23, and the vertical edge 262 is disposed on one side of the second mounting hole 24, and is roughly vertically disposed with the end face of the rear side end 22 of the quick-threading buckle 20. A guide groove 27 which communicates with the third limiting hole 25 is disposed at the inner corner position of the notch groove 26, the third limiting hole 25 extends in a straight line on the inner side wall of one side of the notch groove 26, and the other side wall opposite to the inner side wall is disposed in a convex arc, so as to facilitate mounting of the leash body.

In the embodiment, a convex part 29 is disposed on the right side of the front side end 21 of the quick-threading buckle 20, and due to the disposing of the convex part 29, a strengthening role on the structure of the quick-threading buckle 20 may be played. The quick-threading buckle 20 includes a metal plate in the middle and a plastic part covering the outer side of the metal plate, and the disposing of the metal plate may enhance the strength and prolong the service life of the quick-threading buckle 20. The metal plate extends out of the outer side of the plastic part from edges of the left and right sides of the quick-threading buckle 20 to form a metal locating part 28, and due to disposing of the metal locating part 28, production and processing of the quick-threading buckle 20 in a mold forming process are facilitated. The metal locating part 28 is disposed at the position, and may be sheltered by the leash body 10 in use, so that the aesthetics and safety are better.

The limiting buckle 30 includes a top limiting buckle 31 and a bottom limiting buckle 32, and both the top limiting buckle 31 and the bottom limiting buckle 32 are mounted on the leash body 10 on the upper and lower sides of the third limiting hole 25. The maximum position size of the top limiting buckle 31 and the bottom limiting buckle 32 needs to be greater than the aperture of the third limiting hole 25, so as to realize limiting of the leash body 10. Specifically, in the embodiment, the bottom limiting buckle 32 is an 8-shaped buckle, a penetration inlet 321 and a penetration outlet 322 are disposed on the 8-shaped buckle, and the leash body 10 penetrates in from one side, penetrates out from the other side, and then penetrates into the third limiting hole 25. The bottom limiting buckle 32 may also be movable and removable, that is, clamping openings are formed in the side faces of the penetration inlet 321 and the penetration outlet 322, the leash body 10 may be clamped into the penetration inlet 321 and the penetration outlet 322 from the clamping openings; and the structure is convenient for disassembling and assembling the bottom limiting buckle 32. However, in the embodiment, preferably, the penetration inlet 321 and the penetration outlet 322 of the bottom limiting buckle 32 are of totally closed structures, which, in use, need to be threaded on the leash body 10 from the beginning. Therefore, there is no risk of falling off during use.

The top limiting buckle 31 includes a main body part 311 and a limiting cover 312 buckled on the main body part 311, a hollowed-out hole is formed in the top of the main body part 311, a fixing hole penetrating through front and rear sides is formed in the side of the main body part, the leash body 10 penetrates out through the fixing hole after penetrating out from the third limiting hole 25, and then clamps and covers the limiting cover 312 in the hollowed-out hole from top to bottom, thus clamping the leash body 10 in the main body part 311.

In the embodiment, the leash body 10 includes a mounting end 11 and a free end 12, the mounting end 11 is fixed in the first mounting hole 23 by sewing, pressing or other realizable means, and the free end 12 extends out from the first mounting hole 23, then winds to one side of the second mounting hole 24, and then penetrates out from top to bottom of the second mounting hole 24, and the leash body between the first mounting hole 23 and the second mounting hole 24 defines a first loop ring 13 surrounding the neck of the pet. The leash body 10 extending out from the bottom of the second mounting hole 24 surrounds below the chest of the pet and surrounds out from the other side. The bottom limiting buckle 32 penetrates in from the free end 12 of the leash body 10, is adjusted to an appropriate position below the third limiting hole 25, and is mounted on the leash body 10; then, the side of the leash body 10 penetrates into the third limiting hole 25 from the notch groove 26 and the guide groove 27, and the free end 12 faces upward; then it is turned over and flattened along the extension direction of the third limiting hole 25. The top limiting buckle 31 is adjusted above the third limiting hole 25 to limit the leash body 10. In the embodiment, the top limiting buckle 31 is drawn from the middle of the quick-threading buckle 20, and the leash body 10 extending out of the top limiting buckle 31 forms a traction part for holding, so that the overall balance of the traction leash is excellent.

To sum up, by disposing the quick-threading buckle 20 and the leash body 10, the functions of the traction leash, collar and chest brace may be integrated; and meanwhile, the advantages of fewer accessories, low cost, convenient wearing, fastness and good balance are achieved. For the size of the loop ring, size adjustment within a wide range may be realized, and the application range is wide. The quick-threading buckle 20 is of an integrated structure and does not need assembly, and compared with a split type fastener structure, it has no risk of buckling loosing; and meanwhile, the structure is simple, and the production is easy. In addition, the overall structure of the quick-threading buckle 20 is reasonable in configuration, which has excellent safety and convenience for use of pets. The application has strong practicability and strong popularization significance.

The embodiments described above represent only one implementation mode of the present application, and the description thereof is specific and detailed, but should not be construed as limiting the scope of present application accordingly. It should be pointed out that those of ordinary skill in the art can also make some modifications and improvements without departing from the concept of the present application, and these modifications and improvements all fall within the scope of protection of the present application. Accordingly, the scope of protection of the patent of the present application should be subject to the appended claims.

What is claimed is:

1. A traction leash with a three-point quick-threading buckle, comprising a leash body, a quick-threading buckle and a limiting buckle mounted on the leash body, wherein the three-point quick-threading buckle is configured to mount a leash body, wherein a first mounting hole, a second mounting hole and a third limiting hole are formed in the three-point quick-threading buckle for a pet; the first mounting hole and the second mounting hole are respectively formed on left and right sides of the quick-threading buckle, the third limiting hole is disposed between the first mounting hole and the second mounting hole; and one end of the leash body is fixedly mounted in the first mounting hole, and the other end sequentially penetrates in the second mounting hole and the third limiting hole;

the three-point quick-threading buckle further comprises a guide groove, wherein the guide groove communicates the third limiting hole and an external space of the three-point quick-threading buckle, and the leash body is clamped into the third limiting hole from the guide groove;

both the first mounting hole and the second mounting hole are of a rectangular hole structure, and the first mounting hole and the second mounting hole are distributed in a splayed shape with a distance gradually becoming wider from a front side end to a rear side end;

the third limiting hole is of an inclined long hole structure, and two ends in the length extending direction of the third limiting hole face the first mounting hole and the second mounting hole respectively;

a left side end of the third limiting hole faces the rear side end of the second mounting hole, and a right side end of the third limiting hole faces the front side end of the first mounting hole;

a notch groove is further formed at a rear side end of the three-point quick-threading buckle, and the notch groove communicates with the third limiting hole through the guide groove;

a convex part is further disposed at a front side end of the three-point quick-threading buckle;

the three-point quick-threading buckle comprises a metal plate in a middle and a plastic part covering an outer side of the metal plate, and the metal plate extends out of an outer side of the plastic part from edges of left and right side ends of the quick-threading buckle to form a metal locating part; and the leash body comprises a mounting end and a free end, the mounting end is fixed in the first mounting hole, and the free end sequentially passes through the second mounting hole, the third limiting hole and the limiting buckle; the leash body between the first mounting hole and the second mounting hole defines a first loop ring, the leash body between the second mounting hole and the third limiting hole defines a second loop ring, and the leash body extending out of an outer side of the limiting buckle forms a traction part.

2. The traction leash according to claim 1, wherein the limiting buckle comprises a top limiting buckle and a bottom limiting buckle, and both the top limiting buckle and the bottom limiting buckle are mounted on the leash body on the upper and lower sides of the third limiting hole.

* * * * *